DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED NOVEMBER 4, 1975

940 O.G. 9

T940,017

RESOURCE BALANCING SYSTEM FOR MULTI-PROGRAMMING SYSTEMS WITH A VIRTUAL MEMORY AND PAGING ALLOCATION

Donald Dean Chamberlin, San Jose, Calif., Samuel Henry Fuller, Pittsburgh, Pa., and Leonard Ying-Wu Liu, Saratoga, Calif., assignors to International Business Machines Corporation, Armonk, N.Y.

Filed Mar. 13, 1974, Ser. No. 450,622
**Int. Cl. G06f *9/18***
U.S. Cl. 444—1
1 Sheet Drawing. 6 Pages Specification

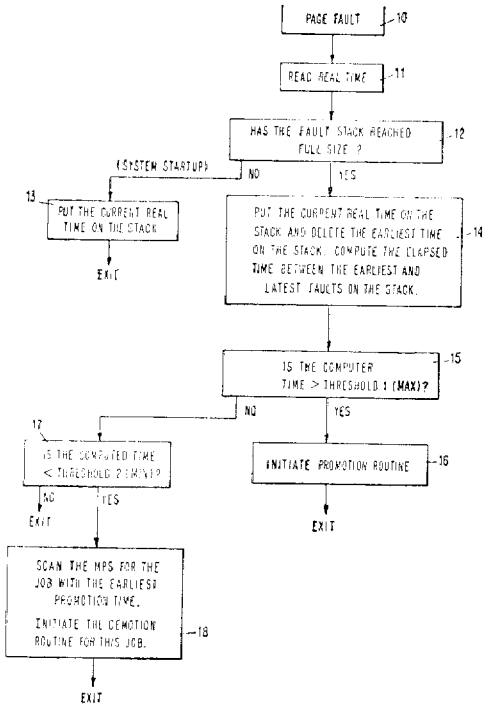

A virtual memory system includes a main memory which accommodates several jobs on a time shared basis. When a job requires data not in the main memory, secondary memory is accessed by means of a signal known as a page fault. A list (stack) of page faults and their real times is recorded. At the time of each fault, the elapsed time for a full stack of faults is calculated and tested to find whether it exceeds a maximum. If so, a new job is then added to the jobs being performed by the system. If the elapsed time is less than a minimum, then the job with the earliest promotion time is demoted from the jobs being performed.

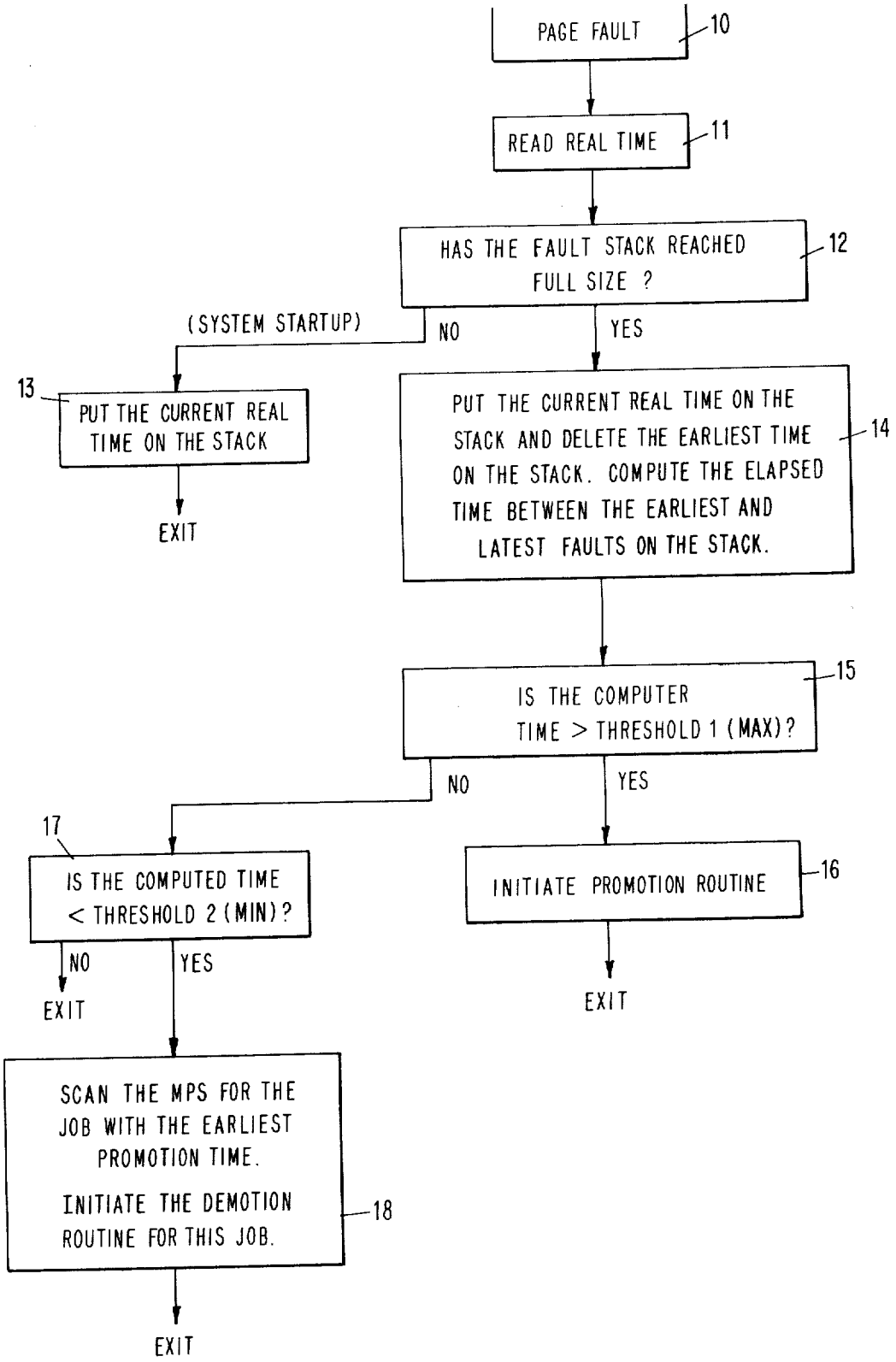

RESOURCE BALANCING SYSTEM FOR MULTIPROGRAMMING SYSTEMS WITH A VIRTUAL MEMORY AND PACING ALLOCATION
Original Filed March 13, 1974